US008075653B2

(12) United States Patent
Phillips

(10) Patent No.: US 8,075,653 B2
(45) Date of Patent: Dec. 13, 2011

(54) AIR QUALITY CONTAINMENT UNIT

(76) Inventor: Ronald E. Phillips, New Castle, PA (US)

( * ) Notice: Subject to any disclaimer, the term of this patent is extended or adjusted under 35 U.S.C. 154(b) by 365 days.

(21) Appl. No.: 12/443,710

(22) PCT Filed: Sep. 26, 2007

(86) PCT No.: PCT/US2007/079605

§ 371 (c)(1),
(2), (4) Date: Mar. 31, 2009

(87) PCT Pub. No.: WO2008/045685

PCT Pub. Date: Apr. 17, 2008

(65) Prior Publication Data

US 2010/0101198 A1 Apr. 29, 2010

Related U.S. Application Data

(60) Provisional application No. 60/850,705, filed on Oct. 10, 2006.

(51) Int. Cl.
*B01D 46/42* (2006.01)
*B01D 46/54* (2006.01)

(52) U.S. Cl. ............ 55/385.2; 55/DIG. 18; 55/DIG. 46; 454/187; 128/205.11; 128/205.26; 600/21; 135/116; 135/119; 135/127

(58) Field of Classification Search ................. 55/385.2, 55/DIG. 18, DIG. 46; 454/187; 128/205.11, 128/205.26; 600/21; 135/116, 119, 127
See application file for complete search history.

(56) References Cited

U.S. PATENT DOCUMENTS

| | | | | |
|---|---|---|---|---|
| 4,485,489 | A | 12/1984 | Pilie et al. | |
| 4,604,111 | A * | 8/1986 | Natale | 95/284 |
| 4,682,448 | A | 7/1987 | Healey | |
| 5,090,972 | A * | 2/1992 | Eller et al. | 95/10 |
| 6,508,850 | B1 * | 1/2003 | Kotliar | 55/385.2 |
| 7,156,897 | B2 * | 1/2007 | Wen | 95/28 |
| 7,188,636 | B1 * | 3/2007 | Kanne et al. | 135/142 |
| 7,393,373 | B1 * | 7/2008 | Krippner et al. | 55/385.2 |
| 2003/0194896 | A1 | 10/2003 | Fetcenko et al. | |
| 2004/0071587 | A1 | 4/2004 | McAtarian | |
| 2008/0196367 | A1 * | 8/2008 | Ryder et al. | 55/385.2 |
| 2008/0282652 | A1 * | 11/2008 | Wardlaw | 55/385.2 |

FOREIGN PATENT DOCUMENTS

| | | |
|---|---|---|
| DE | 91 06 669 | 1/1992 |
| WO | WO 88/07574 | 10/1988 |
| WO | WO 2004/011163 | 2/2004 |

* cited by examiner

*Primary Examiner* — Robert A Hopkins
*Assistant Examiner* — Minh-Chau Pham
(74) *Attorney, Agent, or Firm* — James R. Williams

(57) ABSTRACT

The present invention describes an air quality containment unit for isolating a construction, renovation or maintenance project. The air quality containment unit contains dust, molds and other air-borne pollutants using a filter, such as a high-efficiency particulate air (HEPA) filter, to maintain a negative air pressure in the unit. The air quality containment unit includes at least one sealable orifice that allows workers to introduce, for example, an electrical cord into the unit without breaching containment.

20 Claims, 6 Drawing Sheets

AIR QUALITY CONTAINMENT UNIT

The present invention is a National Phase application of PCT/US2007/079605 and claims priority to U.S. application No. 60/850,705 filed 10 Oct. 2006.

FIELD OF THE INVENTION

The invention relates to a portable enclosure that contains potentially harmful substances during constructions or renovations.

BACKGROUND OF THE INVENTION

Enclosures and partitions, collectively enclosures, are often used to separate portions of a building or room during construction, renovation or maintenance projects. An enclosure serves as a barrier to dust, noise, light, odors, molds, mildews, etc. An enclosure separates the work area from areas that need to remain clean. For example, an enclosure can protect immuno-suppressed patients in a hospital from exposure to potentially harmful molds and bacteria that are released during building repair or maintenance. More simply, an enclosure can prevent construction debris and dust from entering a living space.

A simple enclosure includes a sheet of plastic or cloth that is nailed, screwed, stapled, taped or otherwise affixed floors, ceilings, and abutting walls. Alternatively, prior art teaches a spring-loaded jack system that secures the sheet in place without damage to floors, walls or ceilings. These simple enclosures can contain large particles during projects but, because of relatively large openings do little for very small particles, such as molds.

Large openings can permit the release into the air during and after a project of potentially dangerous amounts of air-borne particulates, mold spores, bio-aerosols, gas phase pollutants and odors. By way of example, molds and fungi are often present in dark, humid areas, such as ceiling tiles, ventilation ducts or pipes, and can cause diseases such as aspergillosis. Aspergillosis includes allergic bronchopulmonary aspergillosis, pulmonary aspergilloma and invasive aspergillosis. Colonization of the respiratory tract is also common. People in a suppressed immunologic state are particularly susceptible. In such people, aspergillosis can result in death.

The Center for Disease Control and Prevention in Atlanta, Ga., USA has recognized that hospital construction and renovation projects pose particular risk to immuno-compromised patients, who may inhale airborne pollutants. Hospitals and other health care facilities have begun using portable enclosures that isolate construction, renovation and maintenance areas from patients. These units often include collapsible frames that support physical barriers. The enclosure should extend from the floor to the underside of the floor above. The unit should include gasketed doors with self-closing latching hardware and dampened walk-off mats both inside and outside of the construction area. The enclosure preferably includes a filter. The filter may include a high-efficiency particulate air (HEPA) filter maintains a negative air pressure in the enclosure relative to the rest of the area and simultaneously scrubs the air of contaminants. Alarms should signal any loss of negative pressure in the enclosure. In this manner, airborne hazards can be isolated from patients.

Present commercial enclosures include rigid enclosures and collapsible enclosures, and comprise one or more plastic sheets stretched around a frame. The sheets often comprise woven polyolefin. The frame may include plastic or metal tubing. Prior art frames can be difficult to disassemble or collapse, and workers often are reluctant to disassemble the enclosure once installed. Wheels may be provided to move the enclosure, whether assembled or collapsed, from place to place. The filter may be placed inside or outside the enclosure. Because the floor of the enclosure is typically no more than about 3×5 feet, placing the unit in the enclosure limits the usable space for the workers. Despite the desire to contain the air-borne particulates, present enclosures require workers to penetrate the physical barrier provided by the enclosure for electric cords, cables or other required facilities. Such penetrations typically by-pass the security measures manufactured into the enclosure. The penetrations permit contaminants to escape from the enclosure and so compromise patient health and safety.

A need exists for a portable enclosure suitable for hospital use that is easily collapsible and substantially completely isolates patients from construction, renovation or maintenance projects.

SUMMARY OF THE INVENTION

The present invention describes an enclosure for use as an air quality containment unit. The enclosure is useful as a temporary enclosure for construction, renovation and maintenance projects. The enclosure includes walls comprising one or more sheets stretched around a frame, a filter such as a high-efficiency particulate air (HEPA) filter for maintaining a negative air pressure in the unit, and at least one sealable orifice integrated with the wall. Optionally, the enclosure includes at least one electrical outlet accessible by a worker inside the enclosure.

The sealable orifice substantially prevents air from flowing into or out of the unit, but permits objects to pass through the sealable orifice. The sealable orifice includes a deformable gasket defining an opening. The gasket may comprise an elastomer, a closed-cell foam, or a gel pack. The opening may be defined, for example, by a plurality of elastomeric baffles, a plurality of gel packs circumscribed around the opening, or a throughbore.

DETAILED DESCRIPTION OF THE INVENTION

The enclosure includes air quality containment unit including a plurality of walls formed by a frame supporting at least one sheet or film. The frame and sheet define a space having a plurality of side walls and, optionally a top wall and a bottom wall. The enclosure should contain air borne particulates that are generated during construction, renovation or maintenance projects. To this end, the sheet comprises a material that is substantially impervious to air-borne particulates, such as dust or mold. The material may be, for example, an extruded or woven plastic such as polyvinylchloride or a spun polyolefin. The space should be large enough that a worker can perform the necessary operations within the enclosure. Practically, this means the space will have a floor that is usually at least about 60×100 cm and preferably at least about 100×150 cm. The height of the space should be at least sufficiently tall for a worker to kneel. One skilled in the art would appreciate that the actual size of the enclosure can vary.

Figure 1:
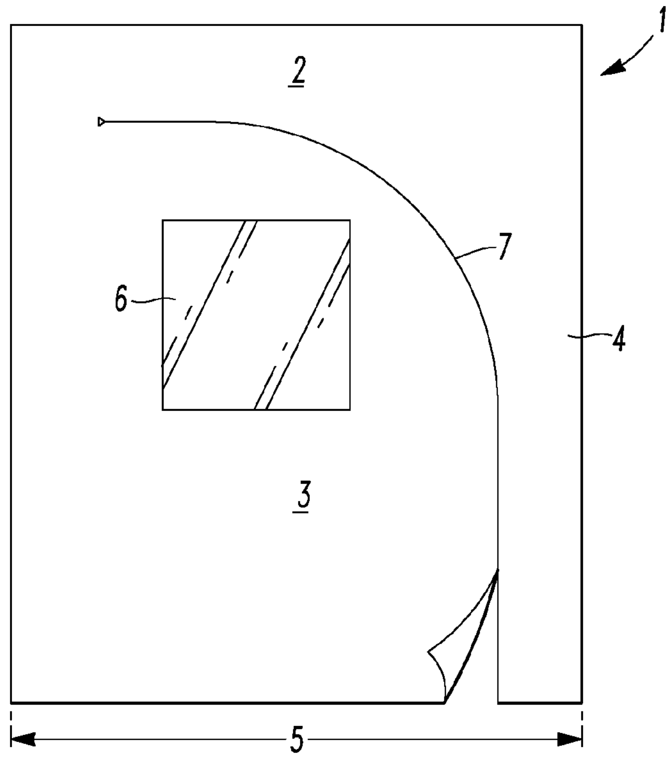
FIG. 1 shows a front view an enclosure of the present invention.

One embodiment of the present invention is shown in FIG. 1. FIG. 1 shows a front view of the air quality containment unit 1. The unit 1 has a front wall 2 having a front width 5. The front wall comprises an entrance flap 3 and a front panel 4. The entrance flap 3 is capable of sealing engagement with the front panel 4. Sealing engagement is facilitated by a sealing fastener 7. The sealing fastener 7 may be continuous such as, for example, a zipper or Velcro® strips. Disengaging the entrance flap 3 from the front panel 4 defines an opening that is sufficiently large for a worker and his tools to enter and exit. Conveniently, the entrance flap 3 may have a window 6 integrated into the entrance flap. The window will typically comprise a clear vinyl.

Figure 2:
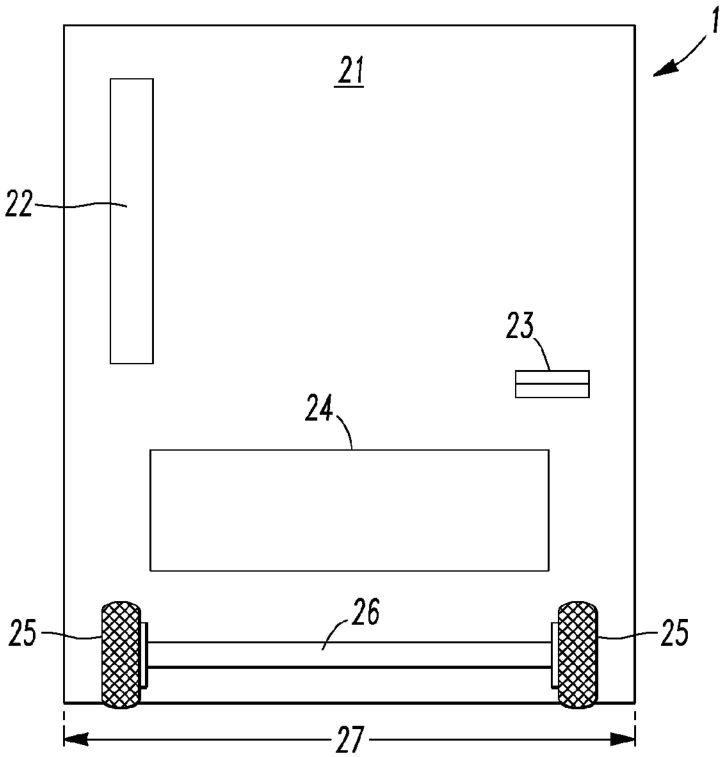
FIG. 2 is a rear view of the enclosure of FIG. 1.

FIG. 2 shows a back wall 21 having a back width 27, and comprising an electrical channel 22, a sealable orifice 23, and filter 24. The back width 27 is often the same dimensions as the front width 5. Optionally, a pair of wheels 25 connected by an axle 26 facilitates portability by permitting the enclosure to be tipped and rolled to a new location. The unit 1 may also have at least one handle, not shown, that facilitates tipping the unit 1 onto the wheels 25. The electrical channel 22 provides electrical power to the enclosure space without breaching containment. The electrical channel 22 includes at least one electrical outlet in the enclosure space that is electrically connected to an electrical plug on the outside of the space. The electrical channel 22 is sealed to prevent the escape of contaminants from the enclosure. Sealing may occur by any means including, for example, a gasket, sealant, welding, laminating, or molding in place. Connecting a source of electricity to the plug supplies electrical power to the outlet. The electrical outlet preferably comprises a power strip having a plurality of outlets.

The sealable orifice 23 permits a worker to pass any suitably sized object through the sealable orifice 23 without substantially breaking containment. The object could be temporarily passed through the sealable orifice 23 or placed there for the duration of the project. Prior art required a worker to unseal the entrance flap or pass the object above or below the enclosure. Prior art had even forced workers to cut the enclosure walls for electrical cords, air compressor cables, etc. Alternatively, workers had lifted the base of the enclosure from the floor. Either solution breached containment of the enclosure.

The sealable orifice 23 includes a gasket defining an opening. Of course, the enclosure may include a plurality of sealing orifices, and the sealing orifices may be distributed in the enclosure walls as needed. The opening can be of any convenient size. Absent any object, the gasket substantially prevents air from passing through the sealable orifice 23. In the presence of an object, the gasket conforms to the exterior dimensions of the object thereby reducing air flow between the enclosure and the outside. Conveniently, a worker can pass a tool, cable, etc. through the sealable orifice 23 without opening the entrance flap. The gasket can be of any suitable design and may comprise an elastomer, closed-cell foam, gel pack, or combination thereof. Elastomer means any material capable of substantially elastic deformation with 100% strain. Elastomers include, for example, natural and synthetic rubbers and copolymers, silicones, and polyurethanes. Closed-cell foams are well-known in the art and comprise polymers such as, for example, polystyrene and substituted and non-substituted polyolefins including polyethylene, polypropylene, polyvinylchloride, and polytetraflouroethylene. Gel pack means any component comprising a deformable outer shell containing a fluid. Fluid means a gas or liquid, in particularly a liquid having a substantial viscous component, such as a gel or polymeric oil. Examples of a gel pack include vinyl shells containing a silicon oil, an aqueous solution, or polymeric gel.

Figure 3:
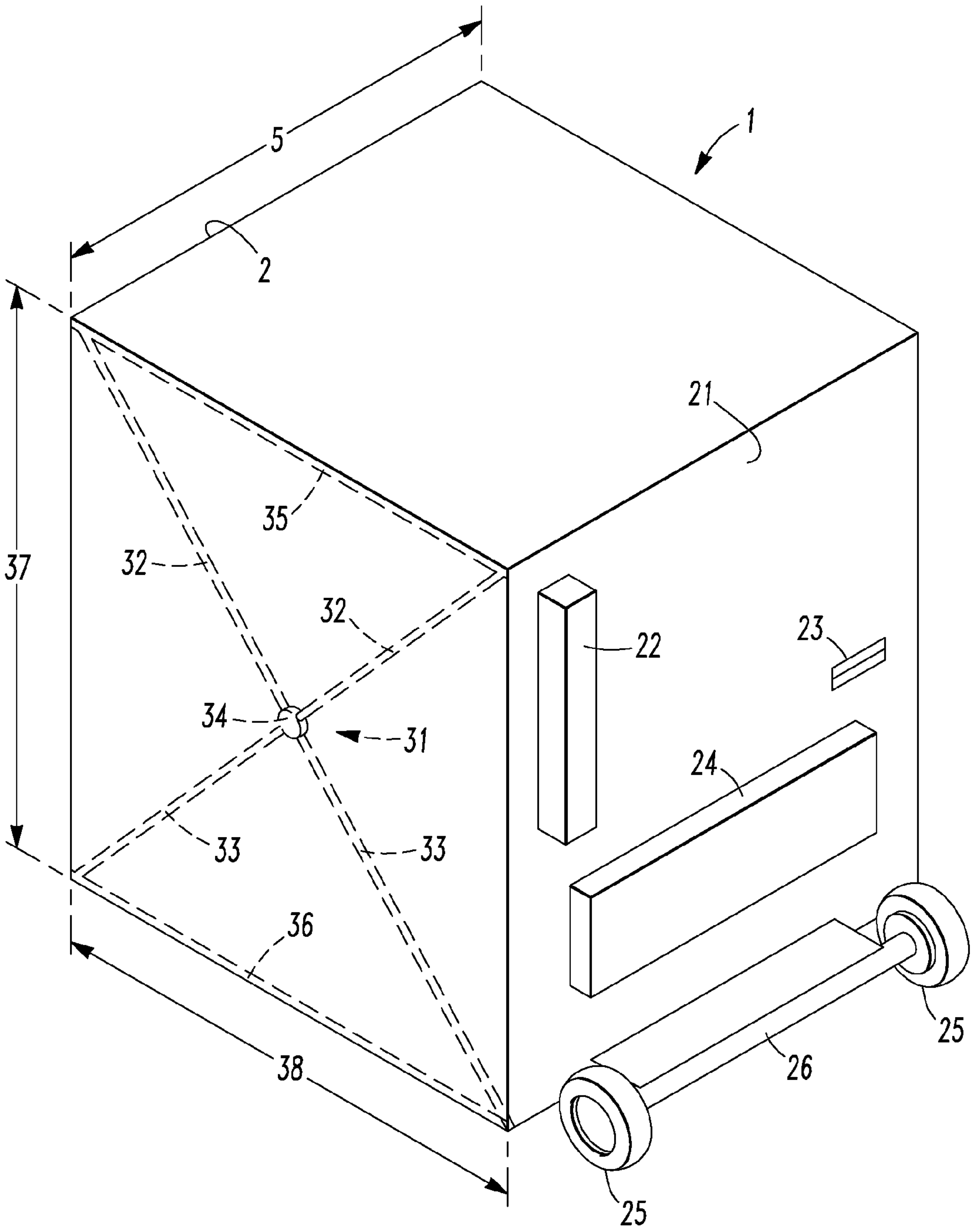
FIG. 3 is a perspective view of the enclosure of FIG. 1.

FIG. 3 shows a side view of a unit 1 having a height 37 and a length 38, and comprising an X-shaped frame 31. The frame 31 includes top spars 32 and bottom spars 33 joined at a hub 34. The hub 34 permits the spars to rotate relatively to each other so that the frame 31 collapses. Preferably, the front wall 2 collapses towards the back wall 21 so that the enclosure may be easily tipped onto the wheels 25. The hub 34 may include a ratcheting mechanism that permits the front wall 2 and back wall 21 to be fixedly separated at various dimensions. Optionally, the frame may include a top member 35 and bottom member 36 to rigidize the frame 31 and improve stability. The members 35, 36 may include a telescoping mechanism for collapsing and setting up the unit 1.

Figure 4:
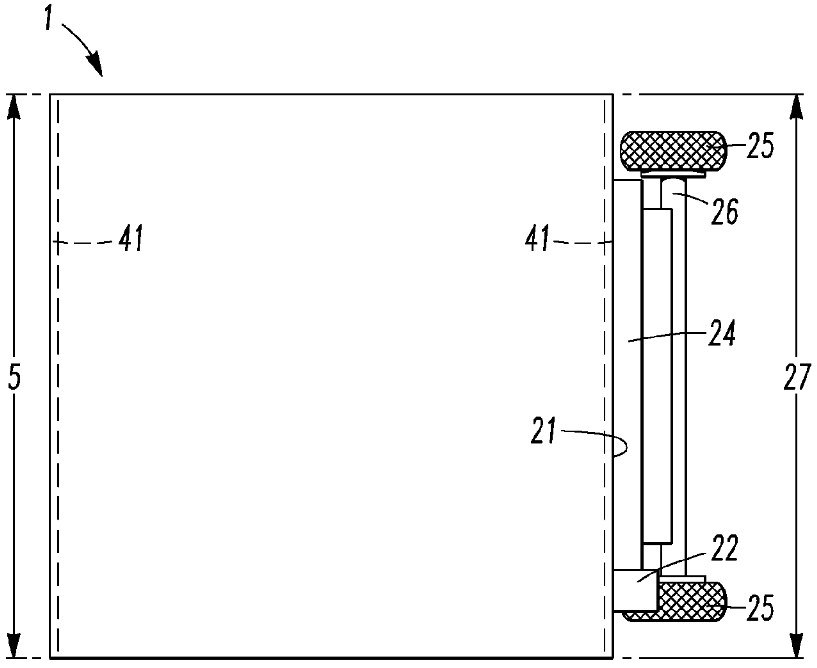
FIG. 4 is a top view of the enclosure of FIG. 1.

FIG. 4 shows a top view of the unit 1 including side spars 41. Side spars 41 may be rigid but may also be telescoping. Telescoping side spars 41 permit changing the widths 5, 27 of the unit 1. Telescoping side spars also permit greater portability of the enclosure. One skilled in the art would appreciate the mechanisms for including a telescoping feature into the side spars 41. In this embodiment, a filter 24 is shown on the outside of the back wall 21 of the unit 1. The filter may be connected to the enclosure via an air duct passing through an enclosure wall. Optionally, the filter 24 may be placed inside the enclosure 1. Typically, the filter will be a HEPA filter. The filter will maintain a negative pressure in the air quality containment unit so that contaminated air does not escape the enclosure. If the filter is outside the enclosure, a sealable orifice may be fashioned to accommodate the air duct. Alternatively, an air duct connection may be fixed to an enclosure wall in the same manner as the electrical channel.

Figure 6:
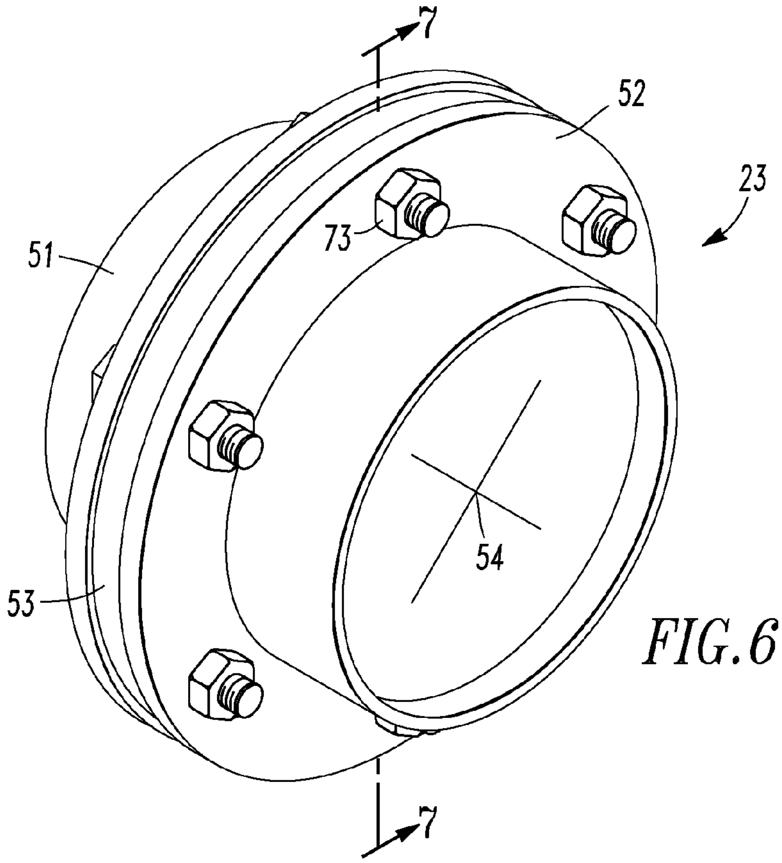
FIG. 6 is a perspective view of the sealable orifice of FIG. 5.
Figure 5:
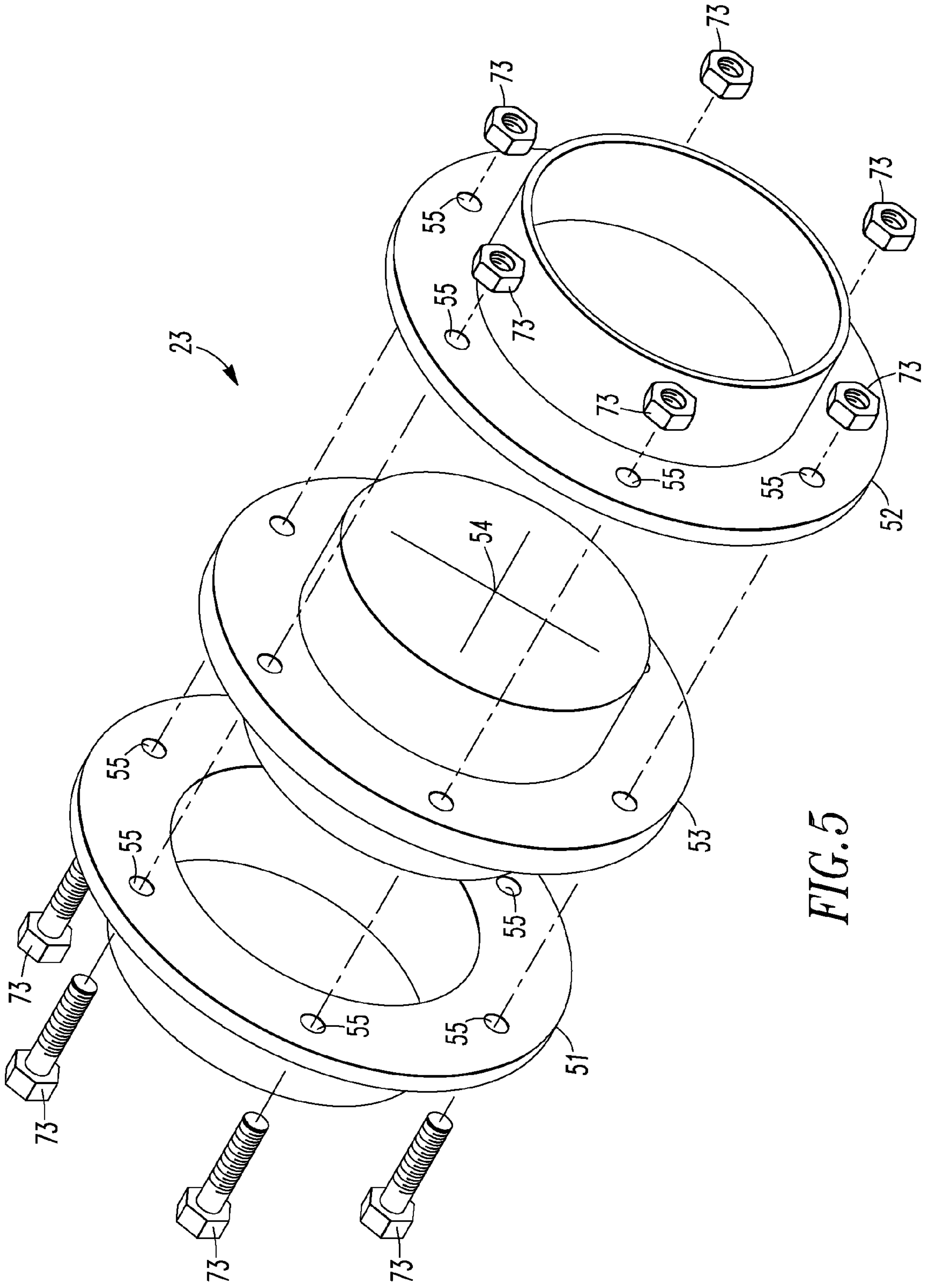
FIG. 5 is an exploded view of a sealable orifice of the present invention.
Figure 7:
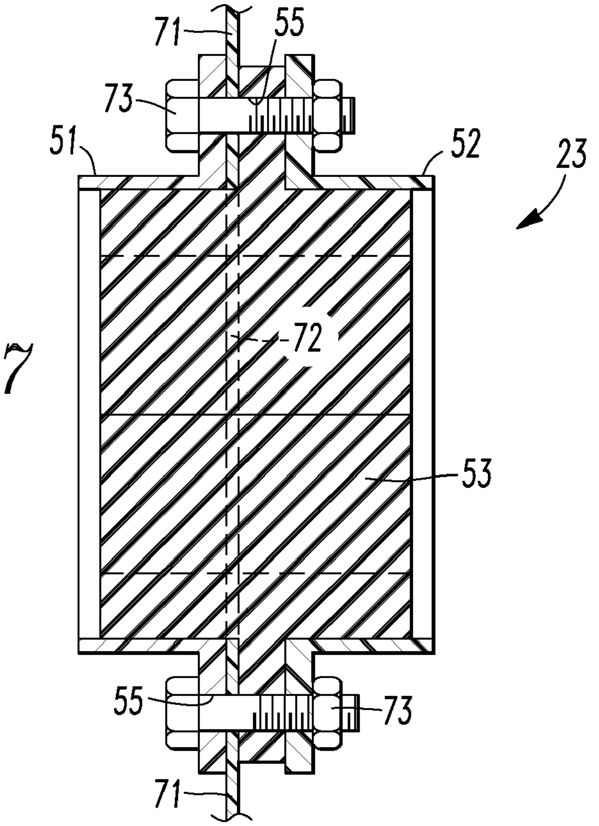
FIG. 7 is a sectional view of the sealable orifice of FIG. 5.

FIGS. 5-7 show one embodiment of the sealable orifice 23. The sealable orifice 23 comprises a pair of flanges 51, 52 sandwiching a deformable gasket 53. The gasket defines an opening 54 that passes completely through the gasket 53. The opening 54 is capable of substantially conforming to objects passing through the opening 54. In operation, a wall 71 of the enclosure will define a hole 72 for receiving the gasket 53. The flanges 51, 52 are placed on either side of the wall 71. Fasteners 73 secure the flanges 51, 52 together through the wall 71 thereby securing the gasket 53 in the hole 72. As shown, the fastener includes a bolt and nut. This embodiment permits replacement of a gasket 53, which has deteriorated, and the flanges 51, 52 reinforce of the hole 72. Alternatively, the gasket may be permanently fixed to the wall such as by welding or adhesive, such that the sealable orifice consists essentially of the gasket.

Figure 8:
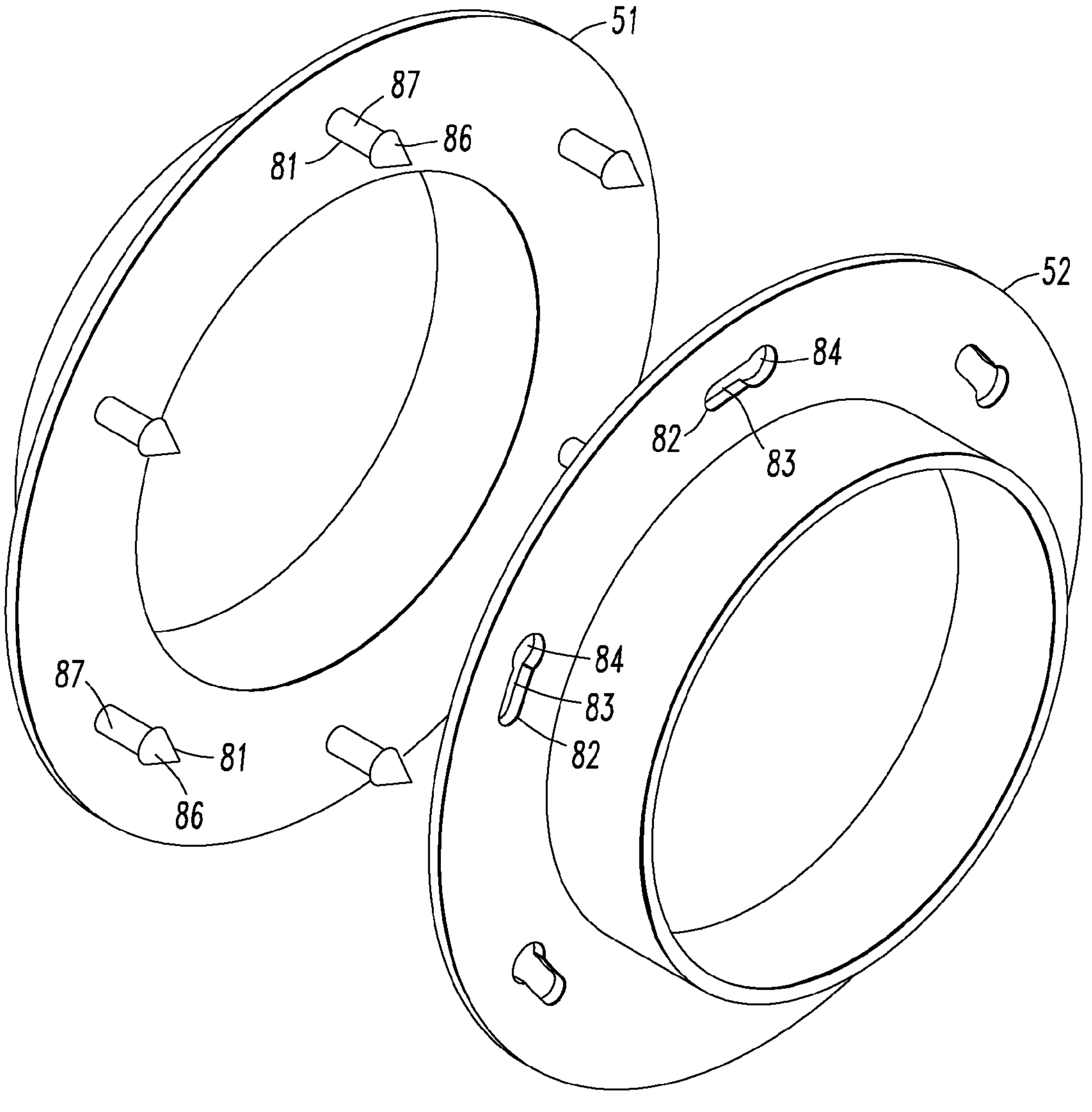
FIG. 8 shows flanges for an alternative embodiment.

An alternative fastener, as shown in FIG. 8, includes a twist-and-lock system. The system comprises a first flange 51 with a plurality of prongs 81 and a second flange 52 defining a plurality of keyhole openings 82. The prongs 81 include a shaft 87 that enlarges at the tip 86. The keyhole opening 82 includes a slot 83 and an aperture 84. The aperture 84 is larger than the slot 83. The prongs 81 of the first flange 51 align with the apertures 84 of the second flange 52 so that the tip 86 extends beyond the aperture 84. Extending the tip 86 beyond the aperture 84 may require a compressive force. Twisting the flanges 51, 52 relative to each other locks the tip 86 against the second flange 52 through the slot 83. Optionally, the prongs 81 may be reinforced to resist breakage during twisting. This fastener permits a sealable orifice to be installed or removed without tools. Conveniently, the prongs 81 may include a sharp tip 86 that can penetrate through the wall 71 by pressing the gasket 53 against the wall 71.

Figure 9:
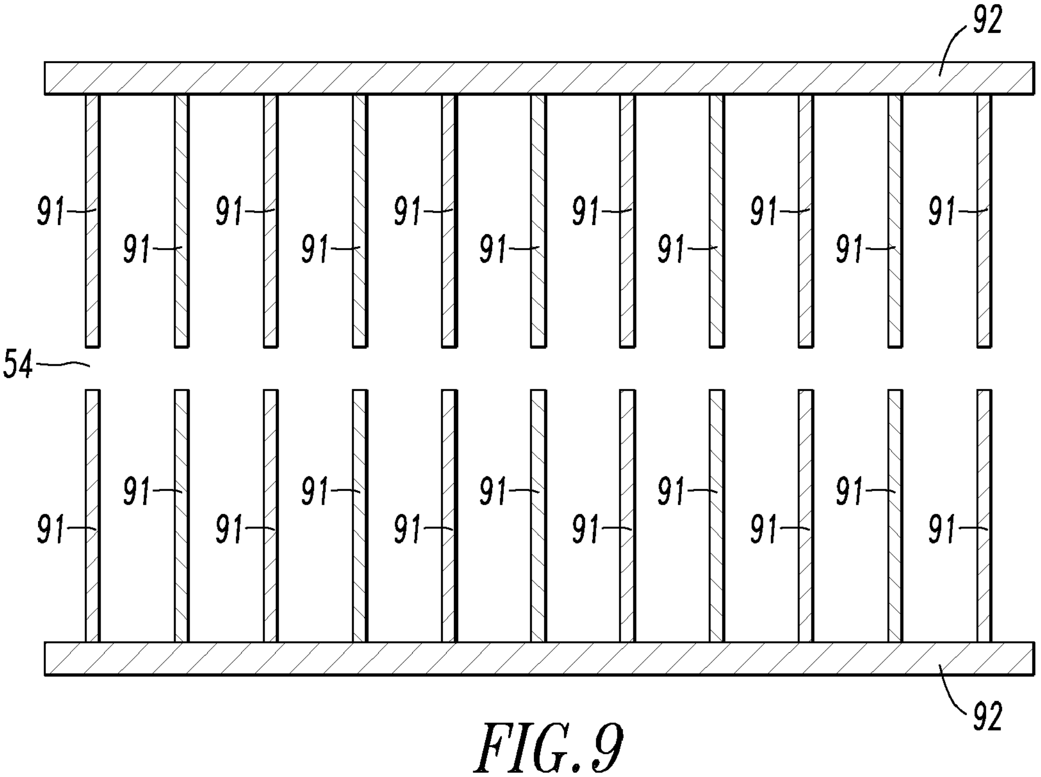
FIG. 9 is a sectional view of another alternative embodiment.

The gasket 53 may define an opening 54 of any convenient size. The size of the opening 54 will depend on its intended use and the elasticity of the gasket 53. For example, where the intended use consists of feeding small cables through the opening and the gasket comprises a relatively soft material such as 1 kg (2.2 pounds) weight polystyrene closed-cell foam, the opening may be formed by one or more slits cut through the gasket. Larger opening may be formed by a plurality of gel packs circumscribing the hole. As shown in FIG. 9, the gasket 53 may even comprise a plurality of elastomeric baffles 91. The baffles extend from a perimeter 92. Each baffle 91 defines an opening 54. The openings 54 permit passage of cords, tubing, wiring, and the like. The openings 54 of the baffles 91 may be in-line as shown or may be staggered to further restrict air ingress/egress.

Obviously, numerous modifications and variations of the present invention are possible. It is, therefore, to be understood that within the scope of the following claims, the invention may be practiced otherwise than as specifically described. While this invention has been described with respect to certain preferred embodiments, different variations, modifications, and additions to the invention will become evident to persons of ordinary skill in the art. All such modifications, variations, and additions are intended to be encompassed within the scope of this patent, which is limited only by the claims appended hereto.

The invention claimed is:

1. A sealable orifice for an air quality containment unit, the sealable orifice integrated into a wall of the air quality containment unit and comprising a deformable gasket defining an opening that substantially prevents air flow through the opening and allows objects to pass through the opening.

2. The sealable orifice of claim 1, wherein the deformable gasket comprises a material selected from a group consisting of an elastomer, a closed-cell foam, a gel pack, and combinations thereof.

3. The sealable orifice of claim 2, wherein the elastomer comprises a material selected from a group consisting of natural rubber, synthetic rubber, silicone, polyurethane, and combinations thereof.

4. The sealable orifice of claim 2, wherein the deformable gasket comprises a plurality of elastomeric baffles.

5. The sealable orifice of claim 4, wherein the plurality of elastomeric baffles extends from a perimeter of the deformable gasket.

6. The sealable orifice of claim 2, wherein the closed-cell foam comprises a material selected from a group consisting of polystyrene, polyolefin, and combinations thereof.

7. The sealable orifice of claim 2, wherein the gel pack comprises a deformable outer shell containing a fluid.

8. The sealable orifice of claim 2, wherein the sealable orifice comprises a plurality of gel packs.

9. The sealable orifice of claim 1, wherein the sealable orifice includes flanges sandwiching the deformable gasket.

10. The sealable orifice of claim 9, wherein the flanges secure the deformable gasket to the wall of the air quality containment unit.

11. The sealable orifice of claim 9, wherein a fastener secures together the flanges.

12. The sealable orifice of claim 11, wherein the fastener includes a bolt and nut, an adhesive, a prong/keyhole assembly, and combinations thereof.

13. An air quality containment unit comprising:

a. a frame comprising by a plurality of spars;

b. a plurality of walls comprising a sheet stretched around the frame, at least one wall defining an opening; and c. a sealable orifice fixed in the opening and comprising a deformable gasket that substantially prevents air flow through the opening and allows objects to pass through the opening.

14. The air quality containment unit of claim 13, wherein the sealable orifice includes flanges sandwiching the deformable gasket, and the flanges securing the deformable gasket to the wall of the air quality containment unit.

15. The air quality containment unit of claim 13, wherein the air quality containment unit including a filter that maintains a negative pressure in the air quality containment unit.

16. The air quality containment unit of claim 13, wherein the plurality of spars includes at least one top spar and at least one bottom spar.

17. The air quality containment unit of claim 16, wherein the plurality of spars join at a hub that controls relative rotation of the top spar to the bottom spar.

18. The air quality containment unit of claim 16, wherein the hub including a ratcheting mechanism that controls rotation of the top spar and the bottom spar.

19. The air quality containment unit of claim 16, wherein the frame including a top member fixed to the top spar and a bottom member fixed to the bottom spar.

20. The air quality containment unit of claim 19, wherein the top member or the bottom member including a telescoping mechanism.

* * * * *